United States Patent Office 3,324,060
Patented June 6, 1967

3,324,060
BLENDING LUBRICOUS ADDITIVES AND SILICA AEROGELS INTO POLYOLEFINS
Howard A. Scopp, Suffield, and Anthony C. Signore, Wethersfield, Conn., assignors to Monsanto Company, a corporation of Delaware
No Drawing. Filed Dec. 5, 1963, Ser. No. 328,165
7 Claims. (Cl. 260—23)

This invention relates to an improvement in blending oily or wax-like additives into tough thermoplastic resinous polymers such as pelletized polyethylene and to compositions useful therein. More particularly the invention relates to the mixing of lubricous materials such as quaternary ammonium salt antistatic agents or the like into thermoplastic resins such as high density polyethylene using powdered silica aerogel as a blending aid.

In making useful articles such as bottles or equipment parts such as gaskets from a thermoplastic resin such as polyethylene it is very often desirable to include in the composition one or a plurality of additives which are lubricous in nature. Thus, for instance, it is often desirable to include antistatic compounds, thermal stabilizers, plasticizers and extenders into the resin composition to impart to it improved physical or chemical properties or to reduce its cost. However, many such desirable additives have been found to be impractical to use in adequate concontrations in the newer types of polyolefin plastics such as high density polyethylene and polypropylene, because the high molecular weight and high degree of crystallinity of these polymers makes them quite insoluble in or incompatible with materials which have been heretofore used successfully in the older types of plastics such as low density polyethylene. The fact that the newer types of plastics, because of their higher melting point, require relatively high processing temperatures has further complicated the problem since most of the desirable organic additives decompose or volatilize at elevated temperatures and therefore will not tolerate long processing times. Since the limited mutual compatibility of the high molecular weight resin and the additive has made long processing times essential to the production of uniform molding powder, the choice of additives available for use in the tough, high molecular weight polyolefins has been greatly restricted and wastefully large amounts of additives have been heretofore resorted to in order to allow for decomposition or evaporation losses in processing. Even this expedient, however, has to some extent aggravated the problem it was designed to alleviate since increasing the amount of lubricous additive coats and lubricates the molding powder being blended, so that the output of the blending equipment is greatly diminished and, especially in the case of a screw extruder, is brought to a complete halt. This occurs as the high lubricity imparted to the surfaces of the pellets causes the extruder screw simply to rotate in the charge without any "bite" and hence without producing the shear forces necessary to coalesce the additive and the pellets or plastic granules. Similarly, on a rubber mill, the lubricated plastic will not coalesce and will tend to fall off the rolls. Often, in such instances, when processing is continued until an apparently good homogeneous plastic mix is obtained it is discovered that essentially all of the charged additive has vanished, in some cases leaving behind decomposition products that cause objectionable discoloration of the resin.

It is an object of the present invention to provide an improvement in processing tough, solid thermoplastic materials, especially high density polyethylene, with oily or lubricous materials and to do so economically without degrading other desirable properties of the plastic such as its translucence, color, strength, etc. Another object is to provide normally lubricous additives in a form suitable for blending into thermoplastic materials in a mechanical mixer such as a screw type extruder. Still other objects will be apparent from the subsequent description of the invention.

Amounts and proportions of materials are expressed in this specification on a weight basis unless indicated otherwise.

It has now been discovered that the difficulties which have plagued the prior art can be overcome by mixing the lubricous additive with the plastic in the presence of a small amount of silica aerogel. More particularly it has been found that mixing the additive with the finely divided, high surface area aerogel produces a dry friable gel or dry powder which is unusually well adapted for addition to thermoplastic materials. Suitable dry premixes can thus be formed when 1 part of lubricous additive is mixed with about 0.1 to 5 parts of finely divided silica aerogel, the use of about 0.25 to 1.0 part of silica aerogel per part of additive being preferred. In preparing such premixes, it is often desirable first to dilute the lubricous additive with an appropriate volatile solvent such as isopropanol or some other $C_1$ to $C_3$ alkanol, or a $C_5$ to $C_9$ saturated hydrocarbon such as heptane, or an appropriate mixture of solvents, to reduce its viscosity and facilitate wetting of the adsorbent, and then evaporating the solvent from the premix before addition to the plastic. When a uniform mixture has been obtained and any volatile solvent has been substantially evaporated or driven off, the dry residue is desirably reground to eliminate lumpiness prior to addition to the pelletized or granular plastic. Alternately, the objects of this invention can be attained by adding the indicated proportion of the silica aerogel directly to the plastic in the processing step either before or concurrently with the lubricous additive.

The adsorbent used in the present invention is finely divided porous silica aerogel, i.e., a silica gel having a particle size of about 0.5 to 5 microns, from which water has been removed without destroying the original gel structure. Such an aerogel is white, essentially transparent in vehicles, and has a refractive index of 1.464, similar to that of the plastic in which it is to be used. Typically, it has a dry bulk density of about 3.5 to 5 pounds per cubic foot, an absolute density of about 17 to 17.3 pounds per gallon, an oil absorption of about 3.0 grams of oil per gram (ASTM), and a surface area of at least 100 square meters per gram, e.g., 110 to 150 square meters per gram. Materials of this kind are commercially available under various trade names, a particularly effective product being "Santocel C," which has an average particle diameter of 3 to 5 microns. A typical analysis of a suitable silica aerogel is as follows:

| | |
|---|---|
| $SiO_2$ _____percent__ | 89.5–91.5 |
| Volatiles _____do____ | 4–6 |
| $Na_2SO_4$ _____do____ | 2–3 |
| $Al_2O_3 + Fe_2O_3$ _____do____ | 1.0 |
| pH (4% solution in $H_2O$) _____ | 3.5–4.0 |

The present invention facilitates the incorporation of all sorts of lubricous additives in a variety of thermoplastic resins but is particularly valuable for the incorporation of such additives in relatively insoluble, high molecular weight polyolefins such as high density, Ziegler-type polyethylene or polypropylene, which have not heretofore lent themselves to ready compounding with lubricous additives. In particular, the present invention is intended for use with tough, high density polyethylene resins which are characterized by a density of at least about 0.92, e.g., 0.945, a number average molecular weight in excess of about 30,000, e.g., 40,000 or more, and a crystalline melt point of about 135° C. or higher. Put differently, the invention is of particular value in conjunction with resins which require processing temperatures above about 140° C., e.g., in the range between about 150° and 170 C., and which accordingly make it desirable to operate with shortest processing times practicable. At these high temperatures, processing times of 5 minutes or more tend to cause excessive thermal degradation or evaporation of many additives, particularly when processing is effected on an open mill. Being able to hold processing times in most instances down to not more than about 5 minutes at temperatures above 150° C. therefore represents a significant advantage of the present invention, as it results both in a more economical use of a costly additive and in a better quality, less degraded product.

The present invention, being essentially physical in nature, is applicable to all types of lubricous or slippery additives which melt below about 180° C. and which one may desire to include in the plastic to improve its antistatic or its antifogging properties, or its flexibility or its mold releasing properties or the like. For instance, many such additives are fatty acid derivatives which characteristically contain a $C_{10}$ to $C_{22}$ hydrocarbon radical and are as a rule very slippery. Fatty amides of $C_{10}$ to $C_{22}$ fatty acids in general, and, in particular, the N-monoalkyl amides of oleic, stearic or palmitic acid, wherein the alkyl group has 12 to 18 carbons, are representative of one kind of these additives. Other representative types include the sodium alkyl sarcosinates such as sodium lauryl sarcosinate, sorbitan ethoxylated fatty esters such as the sorbitan mono-, di- or tri-stearates containing about 4 to 20 ethylene oxide groups per molecule (e.i., the products known commercially as the various grades of "Tween"), the antistatic quaternary amines containing at least one fatty radical, e.g., tallow trimethyl ammonium chloride, and polyethylene glycol monostearate. Other types of lubricous additives useful in this invention include the condensates of octyl or nonylphenol with 1 to 100 moles of ethylene oxide, the liquid silanes, as well as hydrocarbon oils and waxes.

Generally speaking, it is within the scope of this invention to icnlude these additives in the polyolefin resin in a concentration in the range of from about 0.25 to 5%, especially 0.5 to 3%, the optimum concentration depending somewhat on the particular additive used and the effect desired. While concentrations of less than 0.25% are sometimes also of interest, at such very low adidtive concentrations the processing difficulties are less serious and the need for their avoidance by resort to the present invention is less pressing. Among the surprising aspects of the present invention is the finding that though it is believed that the additive becomes adsorbed herein on the silica aerogel in the process and therefore could be expected to be less available to exert its specific effect, the reverse actually appears to be true. The present invention provides a means, for instance, for imparting to plastic compositions a very high degree of antistatic properties with surprisingly low concentrations of organic antistatic agents.

In addition to the silica aerogel and the lubricous additive, the plastic composition may of course include other ingredients of the conventional type, e.g., pigments or colors, antioxidants, U.V. adsorbers, etc. It should be borne in mind, however, that even such finely divided solids such as titanium dioxide pigment are of essentially no value as replacements for the silica aerogel and have no appreciable effect in themselves on the processibility of the plastic when a lubricous additive is added thereto. In fact, when a large amount of a pigment such as titanium dioxide is added to high density polyethylene together with a lubricous additive, blending may become even more difficult than in the absence of any pigment as the latter further deteriorates the coalescent properties of the plastic.

The following examples further illustrate the nature and advantages of the invention:

*Examples*

Tallow trimethyl ammonium chloride (TTAM), a well-known antistatic additive for polyethylene, is typical of the low melting wax-like additives which have heretofore presented processing difficulties. This material, which decomposes between about 160° and 170° C., is one of a great number of materials the potential of which has not been fully realized because they cause excessive lubrication of the molding powder or plastic pellets during mixing and consequently result in incomplete melts, i.e., in non-uniform blends, poor blends on a mill, etc. However, the lubricating effect of this additive can be effectively nullified by absorbing it on silica aerogel according to the present invention as further illustrated below.

A 50% silution of tallow trimethyl ammonium chloride in a solvent containing 72% isopropanol and 28% water was diluted with five times its weight of acetone. Silica aerogel ("Santocel C") was added to portions of the resulting solution to give ratios of solid TTAM to silica aerosol from 1/1 to 2/1. The mixtures were stirred for about five minutes and then heated at 100° C. to drive off the water and organic solvents. The dry residue in each case was lightly reground by means of a mortar and pestle to eliminate lumpiness.

The silica aerogel (S) used in this example had the following properties; particle size, about 3 to 5 microns; absolute density, 17.1 pounds per gallon; oil absroption, 3.0 grams oil/gram (ASTM); index of refraction, 1.464; and a surface area of 125 square meters/gram.

The following formulations were milled into commercial, Ziegler process high density "Hi-Fax" brand polyethylene (PE) on a two-roll mill heated to 163° to 171° C.:

| Example | TTAM/S | Percent TTAM on PE | Results of Milling | Antistatic* |
|---|---|---|---|---|
| 1 | 1/1 | 1.5 | Banded in about 5 minutes | Yes. |
| 2 | 1.5/1 | 1.5 | ___do___ | Yes. |
| 3 | 2/1 | 1.5 | ___do___ | Yes. |
| 4 | 100% TTAM | 1 | Incomplete banding occurred after approximately 10 minutes. | Yes. |

*Antistatic properties were determined by rubbing pressed sheets of the polyethylene with a cotton cloth and then passing the sheet over cigarette ash and observing the pickup.

The formulations tabulated below were run in a commercial Banbury mixer for 20 minutes at 143° C.:

| Ex. | Parts by Weight | | | Results |
|---|---|---|---|---|
| | PE | TiO$_2$ | TTAM/S | |
| 5 | 97.17 | 2 | 0.5/0.33 | Good blend, good antistatic properties. |
| 6 | 97.00 | 2 | 0.5/0.5 | Do. |
| 7 | 96.33 | 2 | 1.0/0.67 | No melt after 25 minutes. |
| 8 | 96.00 | 2 | 1.0/1.0 | Good blend, good antistatic properties. |

It should also be understood that while it is preferred to operate by adding a premix of lubricous additive and silica aerogel to the plastic being processed, satisfactory results are also obtained by adding the aerogel and the additive to the plastic concurrently or in sequence, preferably adding the aerogel before the additive.

The results show that the type of mixing equipment and mixing temperatures can have a significant effect on process performance and that blade type equipment such as a Banbury or a screw extruder are more difficult to operate in the presence of a lubricous additive than a roll mill. Thus, for instance, an examination of Examples 7 and 8 shows that the particular Banbury mixer used did not perform satisfactorily to incorporate 1% TTAM into high density polyethylene at 143° C. when only 2 parts of silica aerogel was present per 3 parts of TTAM but a satisfactory operation was achieved when the proportion of aerogel was raised to 1 part per part of TTAM. On the other hand, Example 2 shows satisfactory handling on a roll mill with a polyethylene formulation containing 1.5% TTAM, even though the ratio of TTAM to silica aerogel in Example 2 was as low as in Example 7. Accordingly, preliminary routine tests should usually be run to determine a suitable silica aerogel concentration for the particular type of equipment, resin formulation, etc.

It will be understood from the foregoing description that this invention lends itself to many variations and modifications without departing from the scope and spirit thereof, the true scope of the invention being particularly pointed out in the appended claims.

What is claimed is:

1. A process of dispersing a lubricous additive in a tough, solid polyolefin which comprises mechanically working about 0.25 to 5 parts of said additive per 100 parts of said polyolefin into said polyolefin together with finely divided silica aerogel having a surface area of at least 100 sq. m./gram, at a temperature between about 140° C. and 180° C., said aerogel being added to provide 0.1 to 5 parts thereof per part of lubricous additive.

2. A process for uniformly dispersing a lubricous additive into high density polyethylene resin which comprises charging 100 parts of granular particles of said resin into a mixing zone, further charging about 0.25 to 5 parts of a lubricous additive and finely divided silica aerogel having a surface area of at least 100 sq. m. per gram into said zone, the aerogel being charged to provide a weight ratio of said aerogel to said lubricous additive of between about 0.1/1 and 5/1 and sufficient to permit forming a homogeneous resin melt in said zone at a temperature between about 140° C. and 180° C. in a period of less than about 20 minutes, and mechanically working the resulting mixture in said zone to form a homogeneous melt.

3. A process according to claim 2 wherein the additive is a wax-like quaternary ammonium salt of a $C_{12}$ to $C_{22}$ fatty acid.

4. As a new composition of matter, a uniform mixture comprising 20 to 400 parts by weight of a tough polyolefin, one part by weight of a lubricous additive which melts below about 180° C. and about 0.1 to 5 parts by weight of silica aerogel having a surface area of about 110 to 150 square meters per gram.

5. A composition of matter according to claim 4 wherein said additive is sodium lauryl sarcosinate.

6. As a new composition of matter, a uniform mixture comprising 20 to 400 parts by weight of a tough polyolefin, 1 part by weight of a quaternary ammonium salt of a $C_{12}$ to $C_{22}$ fatty acid and 0.5 to 1 part by weight of finely divided silica aerogel having a surface area of about 110 to 150 square meters per gram.

7. A composition of matter according to claim 6 wherein said quaternary ammonium salt is tallow trimethyl quaternary ammonium chloride.

References Cited
UNITED STATES PATENTS

| | | |
|---|---|---|
| 2,579,375 | 12/1951 | Eisen. |
| 2,836,517 | 5/1958 | Gruber et al. |
| 2,879,244 | 3/1959 | Coler _____ 260—32.6 |
| 2,956,035 | 10/1960 | Mock _____ 260—41 |

FOREIGN PATENTS

| | | |
|---|---|---|
| 858,130 | 1/1961 | Great Britain. |

MORRIS LIEBMAN, *Primary Examiner.*

L. T. JACOBS, *Assistant Examiner.*